J. N. O'NEIL.
LUGGAGE CARRIER FOR AUTOMOBILES.
APPLICATION FILED JULY 10, 1917.
1,255,778.
Patented Feb. 5, 1918.
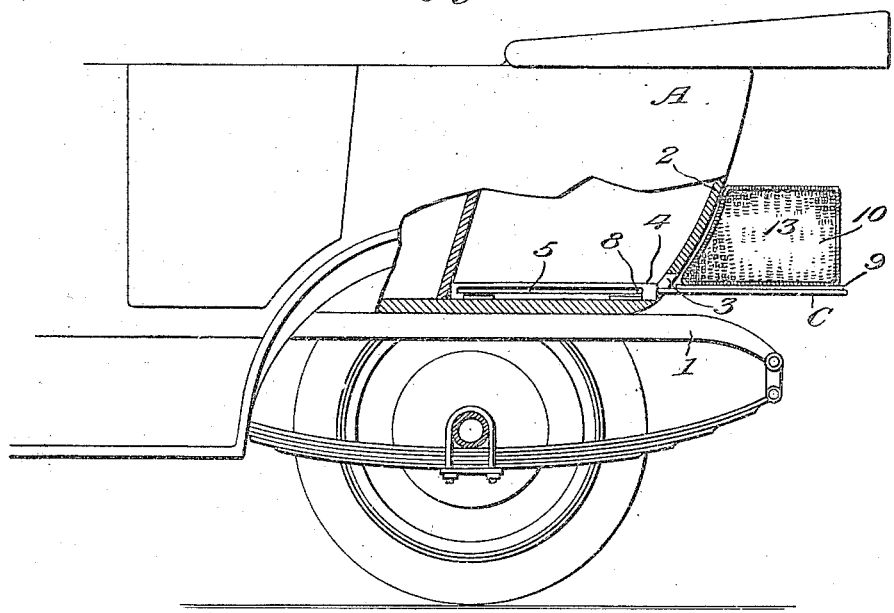
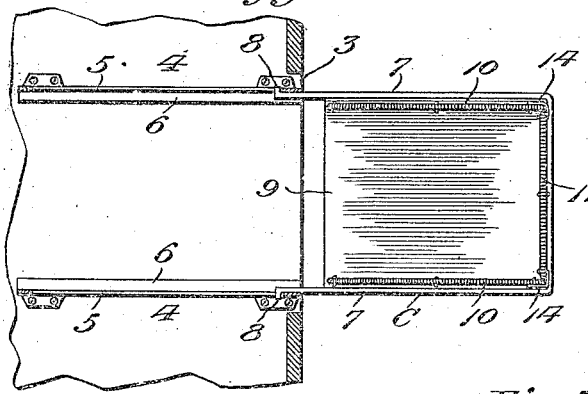
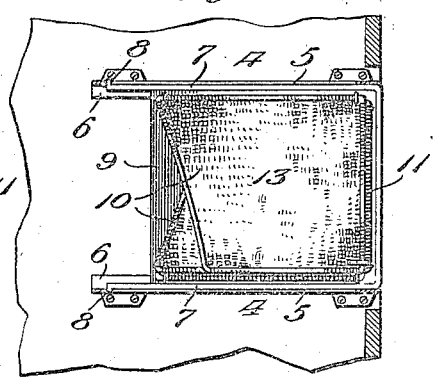
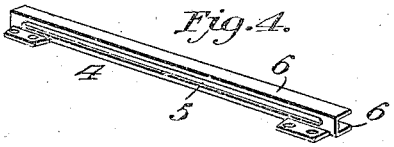
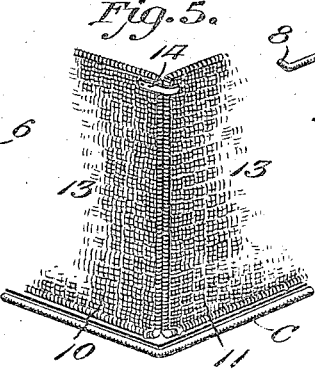
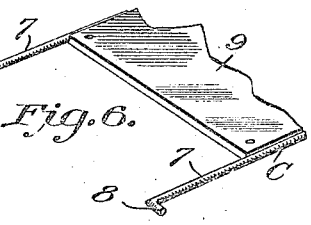

UNITED STATES PATENT OFFICE.

JOHN NIXON O'NEIL, OF ELIZABETH, PENNSYLVANIA.

LUGGAGE-CARRIER FOR AUTOMOBILES.

1,255,778.  Specification of Letters Patent.  Patented Feb. 5, 1918.

Application filed July 10, 1917. Serial No. 179,704.

*To all whom it may concern:*

Be it known that I, JOHN NIXON O'NEIL, a citizen of the United States, and resident of Elizabeth, county of Allegheny, and State of Pennsylvania, have invented certain new and useful Improvements in Luggage-Carriers for Automobiles, of which the following is a specification.

This invention relates to an improvement in luggage carriers for automobiles, and the object is to provide a collapsible basket or container, which when not in use may be slid into a pocket formed in the body of the vehicle, and thereby concealed.

The invention consists of certain novel features of construction and combinations of parts, which will be hereinafter described and pointed out in the claims.

In the accompanying drawings:—

Figure 1 is a view partly in elevation and partly in section, showing the invention applied to the body of a vehicle or automobile;

Fig. 2 is a detail sectional view of the body of the vehicle, and showing the luggage carrier in extended position, or in a position to receive luggage;

Fig. 3 is a similar view showing the luggage carrier in its innermost and collapsed position;

Fig. 4 is a detail view in perspective of one of the guides;

Fig. 5 is a detail perspective view of a corner of the carrier; and

Fig. 6 is a detail perspective view of a portion of the carrier.

A, represents the body of the automobile, and 1 is the frame on which the body is supported.

The back 2 of the body is provided with a slot 3 near the lower edge thereof, and secured to the floor or bottom of the body and in the same horizontal plane with the slot 3 are two guide members 4.

The guide members 4 are provided with a longitudinal slot 5 and two parallel flanges 6.

A U-shaped frame member C, has its shanks 7, each received between the flanges 6 of the guide members 4, and a lug 8 formed on the outer terminal of each of the shanks 7 is received in the longitudinal slots 5 of the guide members. The lugs 8 prevent the frame from being drawn too far from the body A, and with the shanks 7 form a support by their engagement with the guide members 4 for holding the luggage carrier in a horizontal position.

A base or bottom 9 is fastened between the shanks 7 of the frame C, and hinged to the side edges and along one end of the base 9 are side and end members 10 and 11 respectively. The side and end members consist of a frame on which is applied a suitable netting 13. Connected to the side members 10 are hooks 14 which engage the end member for holding it in place. The end member is received between the side members, and when the members are fastened together by the hooks 14, they will remain in a vertical position for holding the articles placed on the base 9 and within the confines of the members.

When the frame C is withdrawn from the body A through the slot 3, the sides 10 are swung upwardly and then the end member 11 is swung to a vertical position between the side members; and when it is desired to return the carrier within the body of the vehicle, the end member is first swung downward onto the base, and then the side members, whereupon the carrier can be forced or slid through the slot 3, and inwardly into the body of the vehicle.

The inner ends of the side members 10 are shown inclined to conform to the contour of the body of the back of the vehicle, but it is to be understood that they may be made in different shapes to conform to the contour of any body, and in this manner the ends of the side members form a closure in connection with the outer wall of the back of the body, for closing the inner end of the carrier.

It is evident that slight changes may be made in the form and arrangement of the several parts described without departing from the spirit and scope of the invention, and hence, I do not wish to be limited to the exact construction herein set forth.

What I claim is:—

1. The combination of a vehicle body having a slot therein, guide members connected to the body, a frame adapted to slide through the slot in the body and having engagement with the guide members, and collapsible side and end members connected to the frame.

2. The combination of a vehicle body, a disappearing frame slidably connected to the body, and a collapsible body connected to the frame consisting of hinged sides and an end, said sides and end being adapted to be moved into upright position when the frame is extended for the purpose of receiving the luggage.

3. The combination of a vehicle body, a disappearing frame slidably connected to the body, and a collapsible body connected to the frame, consisting of hinged sides and an end, and hooks carried by the sides for engagement with the end for holding the several members together.

JOHN NIXON O'NEIL.